United States Patent
Su

(10) Patent No.: US 7,374,431 B2
(45) Date of Patent: May 20, 2008

(54) CLAMPING DEVICE FOR DIGITAL CAMERA MODULE

(75) Inventor: Ying-Tang Su, Miao-Li (TW)

(73) Assignee: Altus Technology Inc., Chu-Nan, Miao-Li Hsien (TW)

( * ) Notice: Subject to any disclaimer, the term of this patent is extended or adjusted under 35 U.S.C. 154(b) by 0 days.

(21) Appl. No.: 11/472,966

(22) Filed: Jun. 21, 2006

(65) Prior Publication Data

US 2007/0128910 A1    Jun. 7, 2007

(30) Foreign Application Priority Data

Dec. 2, 2005    (CN)    ......................... 2005 1 0102033

(51) Int. Cl.
*H01R 12/00*    (2006.01)

(52) U.S. Cl. ..................... 439/73; 439/68; 439/331; 396/144

(58) Field of Classification Search ............... 396/144; 439/73, 68, 331

See application file for complete search history.

(56) References Cited

U.S. PATENT DOCUMENTS

| 6,189,845 | B1 * | 2/2001 | Chen ........................ 248/177.1 |
| 7,160,116 | B2 * | 1/2007 | Li .............................. 439/73 |
| 2007/0077051 | A1 * | 4/2007 | Toor et al. ................. 396/144 |

* cited by examiner

*Primary Examiner*—Truc Nguyen
(74) *Attorney, Agent, or Firm*—Jeffrey T. Knapp

(57) ABSTRACT

A clamping device (100) for clamping a digital camera module (300) includes a base (12) and two legs (14). Two legs extend from two sides of the base. Each leg has at least one foot (18). The at least one foot defines an arcuate surface (180). The arcuate surfaces cooperatively define a space for receiving the digital camera module.

10 Claims, 5 Drawing Sheets

CLAMPING DEVICE FOR DIGITAL CAMERA MODULE

TECHNICAL FIELD

The present invention relates generally to a clamping device, and more particularly, to a clamping device for digital camera modules.

BACKGROUND

With the development of wireless communication technologies, increasing numbers of mobile phones and personal digital assistants (PDAs) now include digital cameras as a special feature.

Generally, digital cameras modules need to be mounted in printed circuited boards (PCBs) of portable electronic devices. In order to secure a stable connection, a digital camera module needs to be assembled in a socket connector of a PCB. A typical socket connector 40 is illustrated in FIG. 1. The socket connector 40 is substantially a cube with an open end. The socket connector 40 has a peripheral wall 42 and a bottom portion 43, cooperatively surrounding a cavity for receiving a digital camera module. Four latches 44 are positioned at a respective corner of the inner surface of the peripheral wall 42. Each latch 44 extends from the bottom portion 43, and is bent to have a wave-like configuration. Opposite to each latch 44, the inner surface of the peripheral wall 42 defines a corresponding groove 46. When the latches 44 are pressed towards the peripheral wall 42, each latch 44 may be tilted towards a corresponding groove 46. A plurality of conductive terminals 48 are mounted in the outer surface of the peripheral wall 42 for electrically connecting with a PCB of a portable electronic device.

In assembly, referring to FIG. 2, when a digital camera module 50 is placed in the socket connector 40, the digital camera module 50 may be caused to be inclined because of non-uniform forces for the latches 44. Therefore, the digital camera module 50 might not be successfully secured into the socket connector 40. More seriously, the digital camera 50 or the socket connector 40 may become damaged or destroyed. In addition, after the digital camera module 50 is put into the socket connector 40, the digital camera module 50 is not easy to take out owing to the pressing force from the latches 44 if a good device is not provided. In order to assemble the digital camera module 50 in the socket connector 40, professional tools are needed for different socket connectors 40. Therefore, the costs are relatively high.

Therefore, a new clamping device is desired in order to overcome the above-described shortcomings.

SUMMARY

One embodiment of a clamping device includes a base and two legs. Two legs extend from two sides of the base. Each leg has at least one foot. The at least one foot defines an arcuate surface. The arcuate surfaces cooperatively define a space for receiving the digital camera module.

Other advantages and novel features will become more apparent from the following detailed description when taken in conjunction with the accompanying drawings.

BRIEF DESCRIPTION OF THE DRAWINGS

Many aspects of the present clamping device can be better understood with reference to the following drawings. The components in the drawings are not necessarily drawn to scale, the emphasis instead being placed upon clearly illustrating the principles of the clamping device. Moreover, in the drawings, like reference numerals designate corresponding parts throughout the several views.

DETAILED DESCRIPTION OF THE PREFERRED EMBODIMENTS

Figure 1:
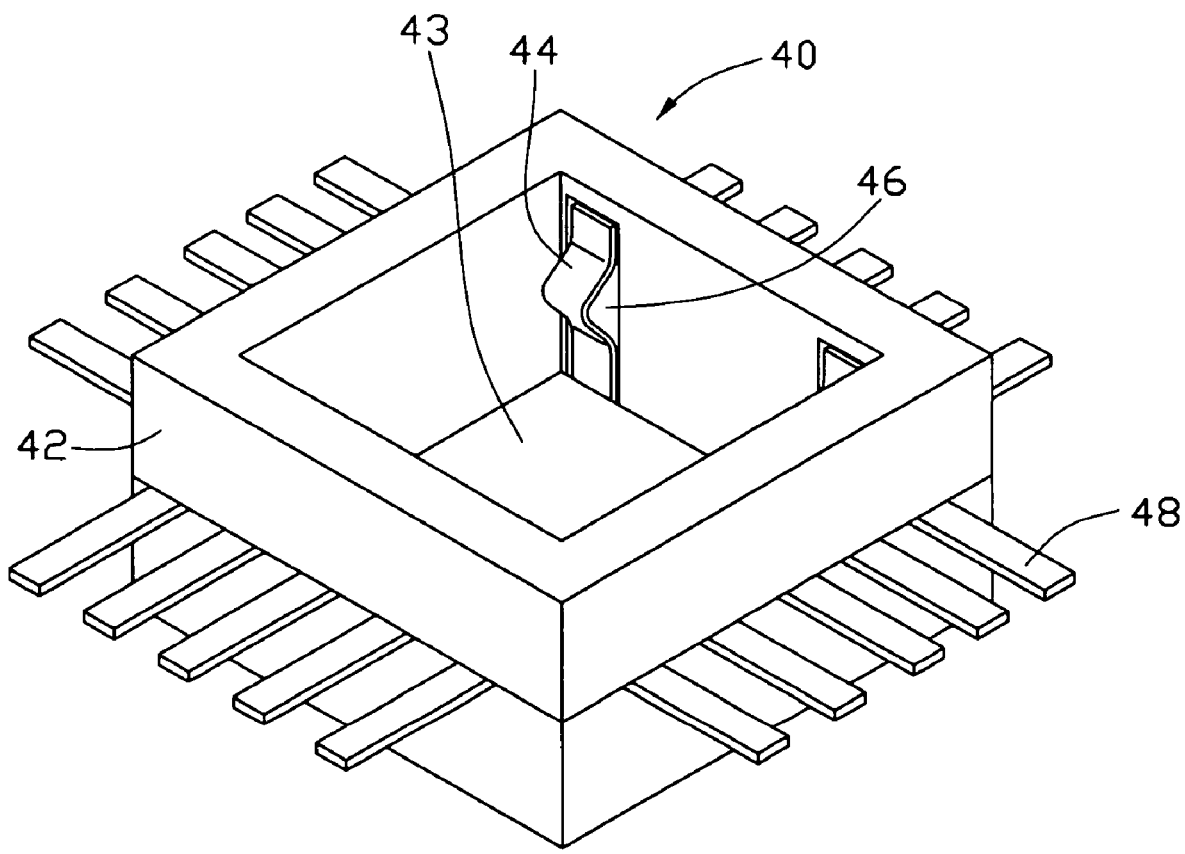
FIG. 1 is a schematic view of a conventional socket connector.
Figure 2:
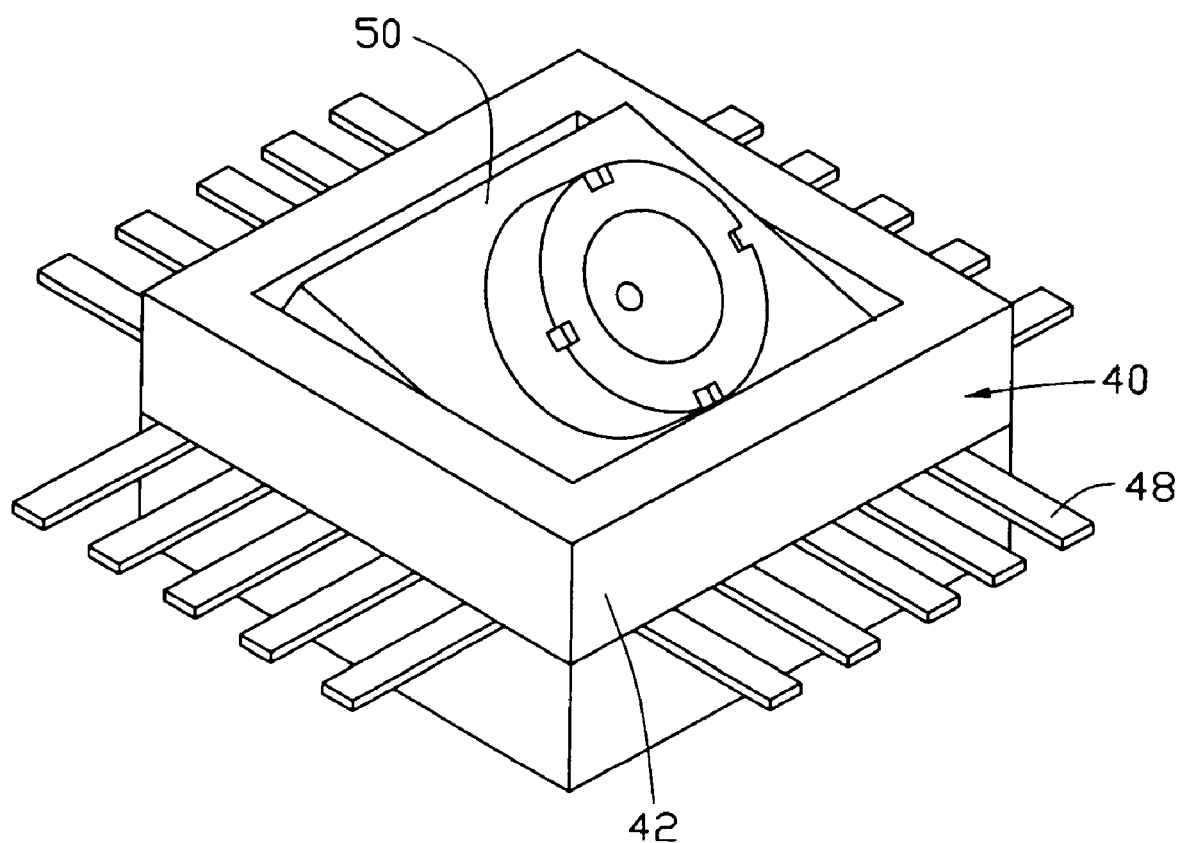
FIG. 2 is an assembled schematic view when a digital camera module is placed in the socket connector.
Figure 3:
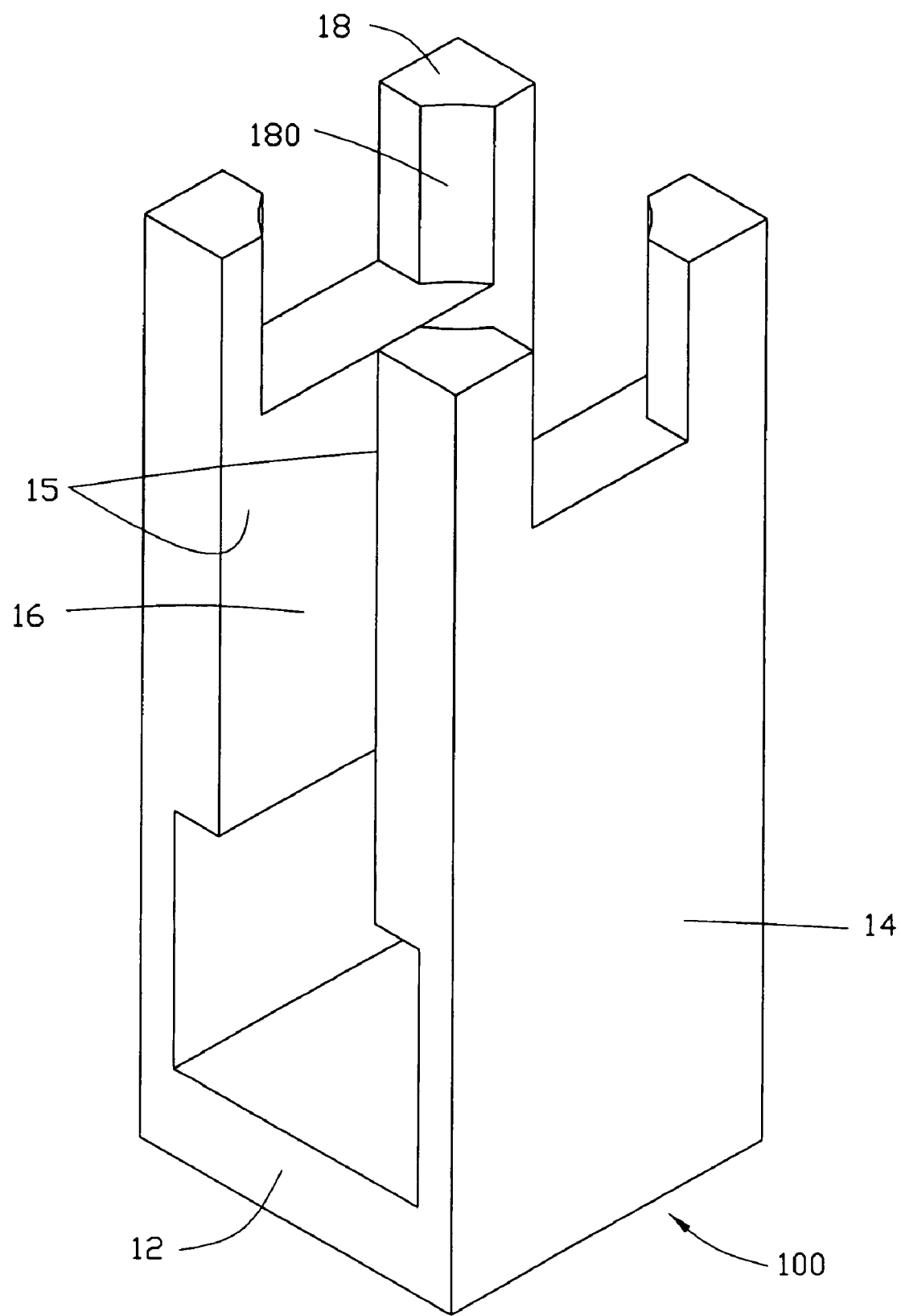
FIG. 3 is a schematic view of a clamping device according to a preferred embodiment.
Figure 4:
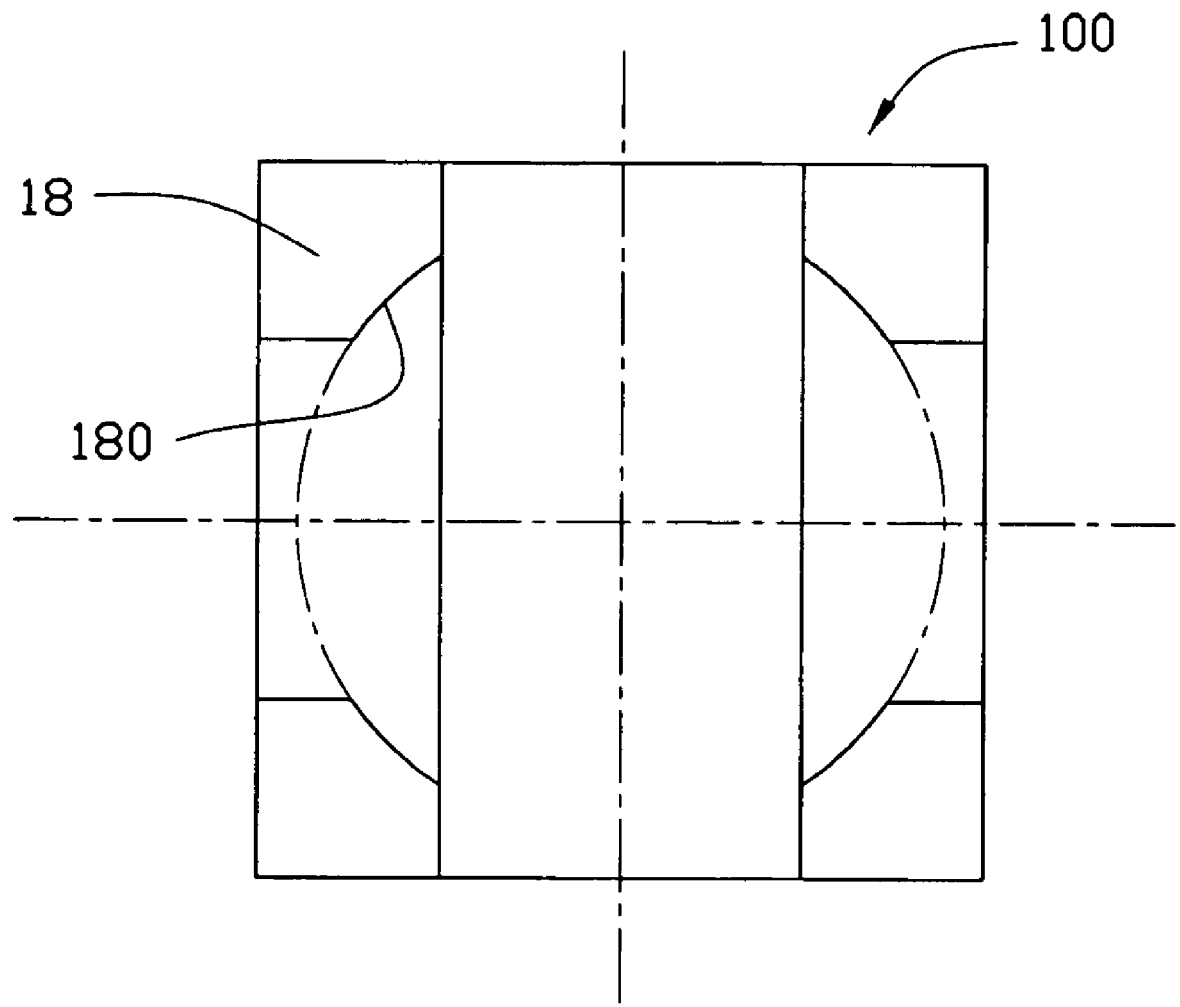
FIG. 4 is a top plan view of the clamping device in FIG. 3.

Referring to FIGS. 3 and 4, a clamping device 100 (i.e. jig), has a substantially U-shaped cross section, and includes a generally flat base 12. The base 12 is a square board. Two parallel legs 14 perpendicularly extend from two sides of the base 12. Each leg 14 is a generally rectangular board and has an inner surface 15. One portion of each inner surface 15 adjacent to the base 12 is recessed inwardly. This structure makes the clamping device 100 more elastic than a purely U-shaped cross section. The two inner surfaces 15 of two legs 12 together with the base 12 cooperatively define a groove 16 therebetween. The groove 16 is substantially an inverted T-shape. A distal end of each leg 14 extends two feet 18 from two sides thereof. Each foot 18 is substantially a prism, and has an arcuate surface 180. Each arcuate surface 180 may be formed by cutting a corner off each foot 18. Four arcuate surfaces 180 cooperatively surround a cylindrical space for receiving a digital camera module. The arcuate surface design of the clamping device 100 increases the contact areas with the digital camera module so as to secure the digital camera module.

Figure 5:
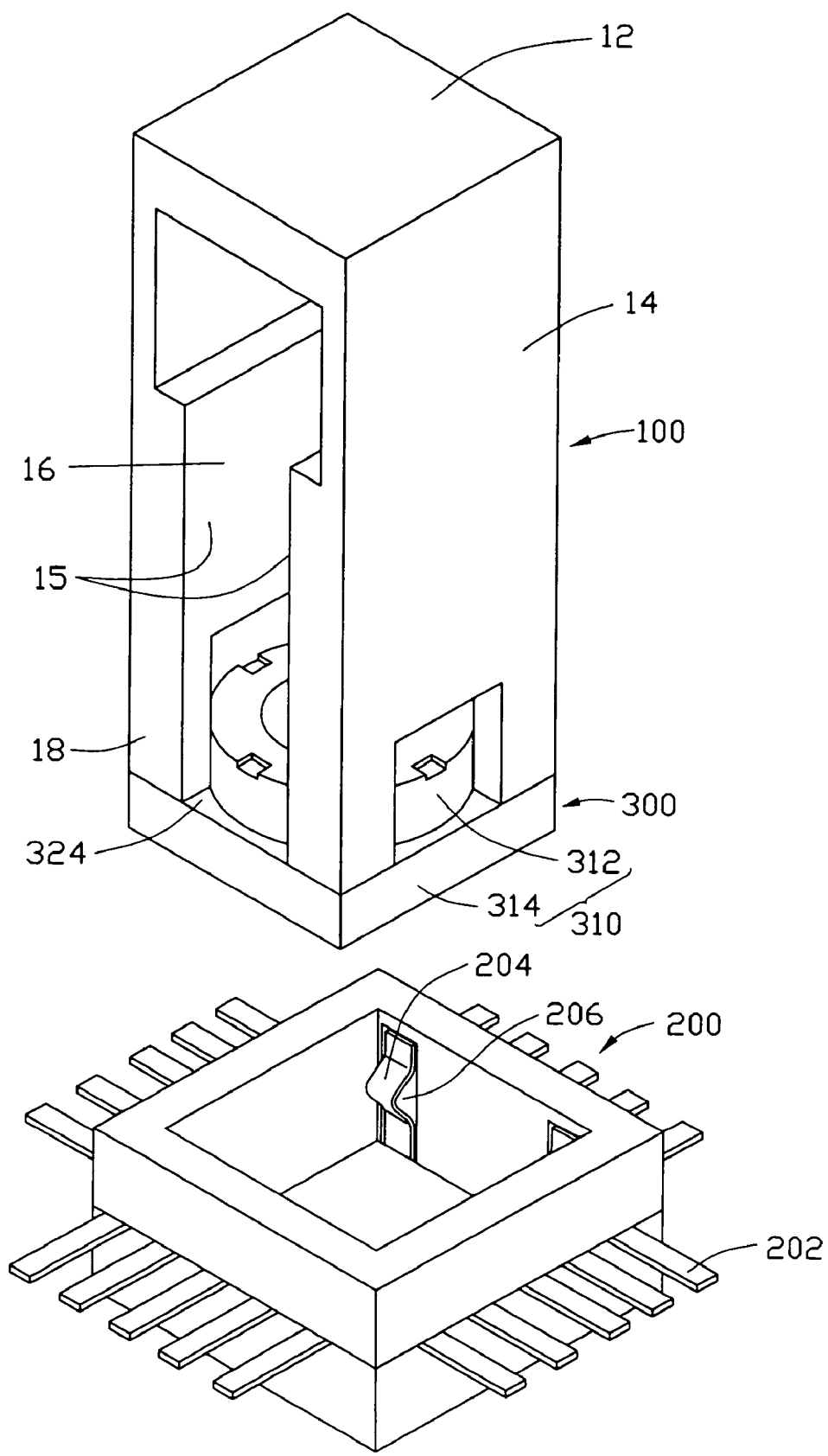
FIG. 5 is an in-use view of the clamping device, showing the clamping device holding the digital camera module above the socket connector.

Referring to FIG. 5, a socket connector 200 includes four latches 204 and a plurality of conductive terminals 202. Each latch 204 corresponds to a groove 206 defined in the socket connector 200. The structure of the socket connector 200 is substantially similar to that of the clamping device mentioned in the background section. Therefore, the socket connector 200 is not detailed. A digital camera module 300 has a hollow holder 310. The holder 310 includes a barrel 312 and a seat 314 formed together. The barrel 312 is a hollow cylinder for receiving lens elements. The seat 314 is a long cube. An outer diameter of the barrel 312 is smaller than an edge of the seat 314 so that a step 324 is formed at a connection between them. The cylindrical space of the clamping device 100 corresponds to a volume of the barrel 312 of the digital camera module 300.

In use, the user holds the base 12 of the clamping device 100, and places two free ends of the feet 18 on the step 324 of the seat 314 of the digital camera module 300. At the same time, the arcuate surfaces 180 of the feet 18 tightly abut the barrel 312. Accordingly, the digital camera module 300 is clamped by the clamping device 100. Then, the clamping device 100 with the digital camera module 300 is lowered into the socket connector 200. The seat 314 of the digital camera module 300 firstly contacts with the latches 204 of the socket connector 200, and presses the latches 204 so that the latches are pushed to incline towards the groove 206. When the clamping device 100 is further lowered into the socket connector 200, the feet 18 press (i.e. resist) the latches 204 of the socket connector 200. The feet 18 push the latches 204 to incline towards the grooves 206 so as to secure the digital camera module 300 in place in the socket connector 200. After the digital camera module 300 is placed, the clamping device 100 can be taken out. The latches 204 resume to the original state, and lock the digital camera module 300 on the step 324. The assembly process of the digital camera module 300 is thus completed. The socket connector 200 provides a stable electrical connection with the digital camera module 300, and the socket connector 200 may be further connected with the PCB of portable electronic device by means of conductive terminals 202.

When the digital camera module 300 is taken out, the four feet 18 are lowered into the socket connector 200. The feet 18 firstly press the four latches 204 of the socket connector 200. During the clamping device 100 moving down, the feet 18 forces the latches 204 to separate from the digital camera module 300. At the same time, the arcuate surfaces 180 of the feet 18 tightly abut against the barrel 312. Then, the clamping device 100 clamps the digital camera module 300 to rise. Accordingly, the digital camera module 300 is taken out.

A main advantage of the clamping device 100 is that it is cheap and simple. This structure makes it possible to use a basic type of U-shape for various different types of socket connectors, merely by selecting different scales of the edge of the base and the diameter of the arcuate surface. In addition, the clamping device 100 may be conveniently operated by manual.

In alternative embodiments, the arcuate surfaces may be replaced with other structure such as an ellipse shape, rectangular or non-circular so as to clamp a digital camera module.

As described above, the preferred embodiment provides a clamping device for a digital camera module, which has both simplicity and ease of use. It is, however, to be understood that the clamping device could potentially be useful in other applications in which it may be desirable to allow clamping something by resisting a locking mechanism so as to attain a stable assembly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A clamping device for releasably clamping a digital camera module, comprising:
    a base;
    two parallel legs extending from two opposing sides of the base, the two legs and the base together defining a substantially U-shaped cross section, each leg further having at least one foot extending from a respective distal end thereof, the at least one foot of each given leg defining an arcuate surface, the arcuate surfaces cooperatively forming a space for receiving the digital camera module, each leg having an inner surface, and one portion of the inner surface adjacent to the base being inwardly recessed, thereby the two inner surfaces together with the base cooperatively defining an inverted T-shape space.

2. The clamping device as claimed in claim 1, wherein the at least one foot is prism-shaped.

3. The clamping device as claimed in claim 1, wherein the arcuate surface is formed by cutting a corner off the at least one foot.

4. The clamping device as claimed in claim 2, wherein the number feet is four, each feet having one of the arcuate surfaces, and the arcuate surfaces cooperatively form a cylindrical space.

5. The clamping device as claimed in claim 1, wherein the base is a square board.

6. A clamping device for clamping a digital camera module to be selectably put in or taken out from a socket connector, the socket connector including a lock mechanism, the clamp device comprising:
    a base;
    two legs respectively extending from two opposing sides of the base, the two legs and the base together defining a substantially U-shaped cross section, each leg further having at least one foot extending from a respective distal end thereof;
    wherein the at least one foot is configured for pushing the locking mechanism of the socket connector so as to place the digital camera module in the socket connector.

7. The clamping device as claimed in claim 6, wherein the at least one foot defines an arcuate surface, the arcuate surfaces cooperatively forming a space for receiving the digital camera module.

8. The clamping device as claimed in claim 7, wherein the number of feet is four, each feet having one of the arcuate surfaces, and the four arcuate surfaces cooperatively form a cylindrical space.

9. The clamping device as claimed in claim 7, wherein the arcuate surface is formed by cutting a corner off the at least one foot.

10. The clamping device as claimed in claim 6, wherein each leg has an inner surface, one portion of the inner surface adjacent to the base is inwardly recessed, thereby the two inner surfaces together with the base cooperatively defining an inverted T-shape space.

* * * * *